United States Patent
Kreis

[11] 3,761,056
[45] Sept. 25, 1973

[54] FAST ACTION VALVE

[76] Inventor: Philipp Kreis, Neumarkter 34-36, Munich, Germany

[22] Filed: Dec. 3, 1971

[21] Appl. No.: 204,452

[30] Foreign Application Priority Data
Dec. 3, 1970 Germany............... P 20 59 610.5

[52] U.S. Cl.............. 251/255, 251/367, 251/368
[51] Int. Cl............................................ F16k 31/524
[58] Field of Search.............. 251/251, 263, 266, 251/267, 268, 366, 367, 368; 16/110, 121, 122, 127; 24/263 SC; 74/89, 99

[56] References Cited
UNITED STATES PATENTS
| | | | |
|---|---|---|---|
| 1,291,183 | 1/1919 | Schulder | 251/268 |
| 1,534,227 | 3/1925 | Livergood | 24/263 SC |
| 3,614,059 | 10/1971 | Rothauser | 251/368 |

FOREIGN PATENTS OR APPLICATIONS
| | | | |
|---|---|---|---|
| 802,840 | 10/1958 | Great Britain | 251/263 |

Primary Examiner—Martin P. Schwadron
Assistant Examiner—David R. Matthews
Attorney—Karl F. Ross

[57] ABSTRACT

A fast-action valve has an axially displaceable but non-rotatable valve stem engageable with a seat in the passage of a valve body. The stem has a pair of laterally extending arms guided in axial slots in an axial sleeve forming part of the valve body. A handle is formed with an axially opening cavity receiving the arms of the stem and provided with a pair of axially symmetrical ramps which coact with the arms to axially displace the stem against the force of a spring on rotation of the handle. The handle is formed of a pair of symmetrically identical members joined together along a plane lying along the stem axis and in line with the two highest points (least-axial-force regions) of the ramps. Furthermore the valve handle has an inwardly projecting rim received by a guide on the sleeve so that the handle merely rotates without being displaced axially on rotation.

5 Claims, 4 Drawing Figures

FAST ACTION VALVE

1. FIELD OF THE INVENTION

The present invention relates to a fast-open, fast-close valve. More particularly this invention concerns a cutoff valve usable with, for example, medium pressure liquids and gases.

2. BACKGROUND OF THE INVENTION

Valves are known wherein, in order to prevent axial displacement of the handle on rotation to actuate the valve, special guides have been provided. These guides necessitate added trouble and expense in construction of the valve.

3. OBJECTS OF THE INVENTION

It is therefore an object of the present invention to provide an improved valve.

Another object of this invention is the provision of a valve wherein the valve handle does not move in the direction of its rotation axis when rotated.

Yet another object is the provision of such a valve which is inexpensive to manufacture.

4. SUMMARY OF THE INVENTION

These objects are attained according to the present invention in a valve wherein the stem has a pair of laterally projecting arms which are engageable with respective ramps formed in a cavity of a two-piece valve handle. The two handle halves are joined together on a plane which lies along the axis of the valve stem. These halves are formed in the cavity with an inwardly directed rim that engages a guide on the valve body or on a sleeve constituting part of the valve body to permit rotation of the handle relative to the body. A spring is provided between the sleeve and the stem bearing at one end on the valve body and at the other end on the two arms to urge the stem and, through the arms, the handle axially away from the body. As the handle is rotated however the ramps will cam the stem down against a valve seat.

In accordance with another feature of the invention the two halves of the handle are snapped together around the sleeve and over the valve operator, here constituted by the stem and the arms thereon. In this manner an extremely neat appearance is given to the valve, with all of the structure concealed beneath or within the handle.

The rim of the handle, according to further features of the invention, either engages under an outwardly directed rim on the sleeve, or fits into a groove on the sleeve. The two handle halves, are advantageously made of synthetic resin, and can be cemented together, joined by spring clips or rings, or coupled by means of pins which can either project from one half and fit into the other or can be fitted into both halves. It is also possible to solvent-weld the two connecting faces to join the two halves together.

5. DESCRIPTION OF THE DRAWING

The above and other objects, features, and advantages of the invention will become more readily apparent from the following description, reference being made to the drawing in which.

6. SPECIFIC DESCRIPTION

Figure 1:
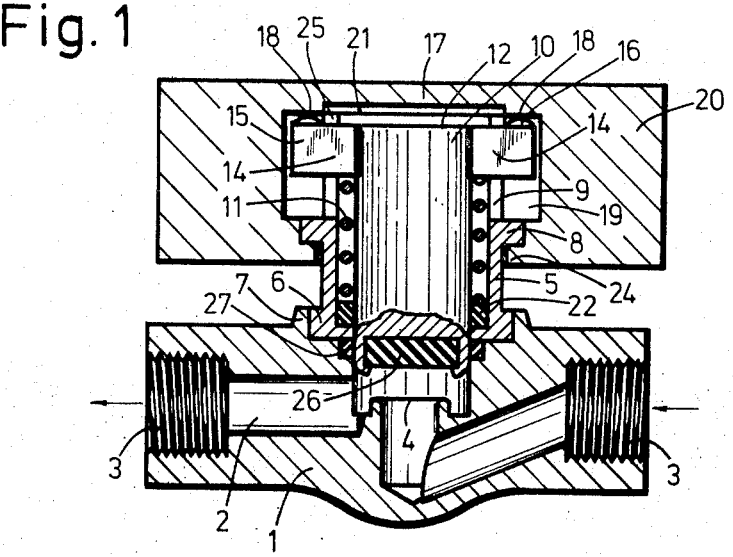
FIG. 1 is an axial vertical section through the valve according to the present invention.
Figure 2:
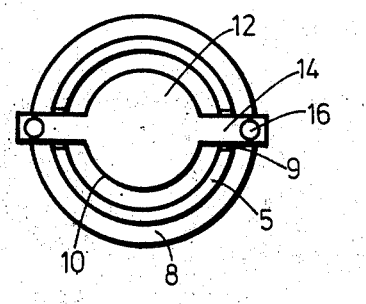
FIG. 2 is a top view of the valve of FIG. 1 with the handle removed.
Figure 3:
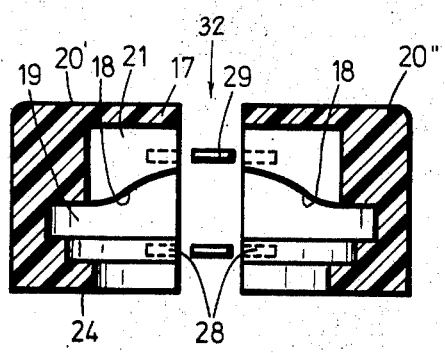
FIG. 3 is an exploded view of a valve handle similar to the handle of the valve of FIG. 1.

As seen in FIG. 1 the valve has a body 1 in which is formed a passage 2 extending from an input connection 3' to an output connection 3''. In the middle of the passage 2 there is formed a laterally open annular valve seat 4 against which is engageable an elastomeric valve washer 26 carried on a valve stem 10.

A sleeve 5 which is coaxial with the seat 4 has a ledge 6 formed at its lower end which is received within a rim 7 on the housing 1. This portion 6 can be screwed or force fitted into the rim 7. The sleeve 5 is formed at its other end with another outwardly projecting rim 8 which is received under a ledge 24 in a cavity 9 of a handle or actuating member 20 for the valve.

Coaxially received within the sleeve 5, and defining a cylindrically annular space in which a compression spring 11 is received, is the valve stem 10 which has a pair of diametrically opposite radially extending arms 14 received in longitudinal slots 9 formed in the sleeve 5. Thus, since the sleeve 5 is nonrotatable relative to the valve body 1, the valve stem 10 is also nonrotatable. The outer ends 15 of the arms 14 are formed with round bosses, balls or like cam followers that ride on a pair of arcuate ramps 18 formed in the cavity 19 of the actuating handle 20 of the valve. Since the cavity 19 is generally cylindrical and the ledge or rim 24 that engages under the ledge or rim 18 is circular this handle 20 can rotate about the sleeve 5.

The extreme upper end 25 of the sleeve 5 is received in a circular recess 21 in the upper surface of the cavity 19 to prevent canting of the handle 20 relative to the sleeve 5. An O-ring 22 is compressed between the lower end of the spring 11 and the sleeve 5, and another seal 27 is provided between the lower end of the sleeve 5 and the body 1.

The handle 20 is formed of a pair of symmetrically identical halves 20' and 20'' interconnected by four spring pins 29 received in holes 28. The split or separation 32 between the handle halves 20' and 20'' is advantageously through that part of the handle 20 corresponding to the highest par of the ramp 18 for reasons explained hereinafter.

Figure 4:
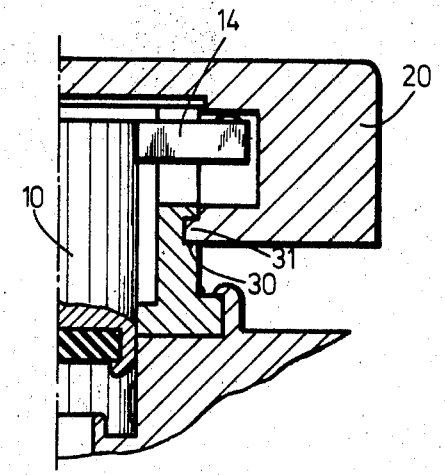
FIG. 4 is a detail view of an alternative embodiment of the present invention.

FIG. 4 shows how the handle 20 can be formed with an inwardly directed ledge 31 received in an outwardly open groove 30 of the sleeve 5'.

The valve described above is of the fast-open, fast-close type wherein rotation of the handle 20 through an angle of 90° in either direction suffices to bring it from the fully opened to the fully closed position. Thus, when the two bosses 18 rest in the position shown in FIG. 1 at the highest regions of the ramps 18, the valve is fully opened. Rotation of the valve handle 20 in either direction will cam the arms 14 and hence the valve stem 10 downwardly against the force of the spring 11 to bring the washer 26 carried on its lower end into sealing engagement with the seat 4 thereby fully closing the valve. The handle 20 is rotatable only; it does not move along its axis of rotation at all but merely rotates therearound.

The separation plane 32 of the handgrip 20 lies perpendicular to the arms 14 when they are in down or lowest position compressing to the maximum the spring 11 and parallel thereto in the relatively unstressed up position so that forces tending to spread the handle 20 apart at this split 32 are minimized.

I claim:

1. A valve comprising:
a valve body formed with a passage having a valve seat;
a cylindrical valve stem having an axis, one end axially displaceable toward and away from seat for blocking fluid flow through a laterally projecting arm;
means engaging said stem for preventing rotation of same about its axis while permitting axial displacement thereof;
a valve-actuating handle formed with an axially open cavity receiving said other end and provided with a ramp, said handle comprising a pair of members connected together and together defining said cavity, said handle being formed at said cavity with an inwardly projecting annular ledge, said valve body having a cylindrical sleeve coaxially surrounding said stem and formed with an outwardly directed guide engageable with said ledge for enabling rotation of said handle relative to said body, said guide including an outwardly projecting flange on said sleeve, said ledge engaging under said flange of said sleeve, said sleeve extending into said cavity; and
a spring received between said sleeve and said stem biasing said stem and said handle away from said seat.

2. The valve defined in claim 1 wherein said sleeve is formed with an outwardly open circumferential groove on said body, said ledge being received in said groove.

3. The valve defined in claim 1 wherein said handle is formed with a circular recess in said cavity receiving the end of said flange, said circular recess being defined by said ramp.

4. The valve defined in claim 1 wherein said stem has a pair of such arms and said handle has a pair of such ramps each cooperating with one of said arms.

5. The valve defined in claim 4, further comprising means for joining said members together along a symmetry plane, said arms being in line with said plane in a minimum-stress position corresponding to the fully open position of said valve.

* * * * *